(12) United States Patent
Bae et al.

(10) Patent No.: US 8,153,331 B2
(45) Date of Patent: Apr. 10, 2012

(54) FABRICATION METHOD OF ANODE AND ELECTROLYTE IN SOLID OXIDE FUEL CELL

(75) Inventors: Joongmyeon Bae, Daejeon (KR); Kwangjin Park, Seoul (KR); Changbo Lee, Daejeon (KR); Jung hyun Kim, Daejeon (KR); Seung-Wook Baek, Gyeongsangnamdo (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 411 days.

(21) Appl. No.: 11/943,414

(22) Filed: Nov. 20, 2007

(65) Prior Publication Data
US 2009/0029218 A1    Jan. 29, 2009

(30) Foreign Application Priority Data

Jul. 24, 2007 (KR) .................. 10-2007-0073847

(51) Int. Cl.
*H01M 8/10* (2006.01)
(52) U.S. Cl. ........ 429/523; 429/527; 429/533; 502/302; 502/304; 502/337
(58) Field of Classification Search ............ 429/12–46, 429/523, 527–529, 532–535; 502/100, 300, 502/302–304, 325–339
See application file for complete search history.

(56) References Cited

U.S. PATENT DOCUMENTS

| | | | |
|---|---|---|---|
| 5,702,837 A * | 12/1997 | Xue ............................. | 429/40 |
| 6,593,020 B1 * | 7/2003 | Yoo et al. ..................... | 429/33 |
| 6,663,999 B2 * | 12/2003 | Van Berkel et al. ........... | 429/482 |
| 2002/0098404 A1 * | 7/2002 | Shibata et al. .................. | 429/40 |
| 2003/0059668 A1 * | 3/2003 | Visco et al. ..................... | 429/44 |
| 2003/0077504 A1 * | 4/2003 | Hara et al. ...................... | 429/44 |
| 2006/0093887 A1 | 5/2006 | Nammensma et al. | |
| 2007/0015045 A1 | 1/2007 | Lee et al. | |

OTHER PUBLICATIONS

S. Beaudet Savignat et al., "Tape casting of new electrolyte and anode materials for SOFCs operated at intermediate temperature," Journal of the European Ceramic Society 27, 2007, pp. 673-678.

Teruhiko Misono et al., "Ni-SDC cermet anode fabricated from NiO-SDC composite powder for intermediate temperature SOFC," Journal of Power Sources 157, 2006, pp. 754-757.

Kyung Joong Yoon et al., "Polarization measurements on single-step co-fired solid oxide fuel cells (SOFCs)," Journal of Power Sources 172, 2007, pp. 39-49.

* cited by examiner

*Primary Examiner* — Basia Ridley
*Assistant Examiner* — Jacob Buchanan
(74) *Attorney, Agent, or Firm* — The Webb Law Firm

(57) ABSTRACT

The present invention relates to a fabrication method of a solid oxide fuel cell. The fabrication method of a fuel electrode and electrolyte of a solid oxide fuel cell (SOFC) in which a sheet cell including a fuel electrode sheet and an electrolyte sheet is positioned at an upper side of a surface of a fuel electrode pellet, comprising steps of (a) molding and heat-treating powder, in which a fuel electrode material is mixed with a pore forming agent, so as to prepare a fuel electrode pellet; (b) stacking the fuel electrode sheet containing the fuel electrode material and the electrolyte sheet containing an electrolyte material so as to prepare the sheet cell; and (c) coating an adhesive slurry containing the fuel electrode material on the sheet cell or the pellet and adhering the fuel electrode sheet of the sheet cell and the pellet and then heat-treating it.

14 Claims, 4 Drawing Sheets

FABRICATION METHOD OF ANODE AND ELECTROLYTE IN SOLID OXIDE FUEL CELL

TECHNICAL FIELD

The present invention relates to a fabricating method of a solid oxide fuel cell (SOFC), and more particularly, to a fabrication method of a low/middle temperature SOFC.

BACKGROUND ART

A solid oxide fuel cell (SOFC) is comprised of a fuel electrode (anode), an air electrode (cathode) and electrolyte. In order to use the SOFC at a low/middle temperature, the electrolyte should have high conductivity at a low temperature. According as a temperature of the SOFC is lowered, ceria-based electrolyte is used instead of 8-YSZ (YSZ Yttria Stabilized Zircornia) in which $Y_2O_3$ is doped into $ZrO_2$. It is caused by that the 8-YSZ has high ion conductivity at a high temperature but has low ion conductivity at a low temperature, whereas the ceria-based electrolyte has high ion conductivity even in the low temperature.

Further, in order to minimize a resistance of the electrolyte, the electrolyte should be provided to be as dense and thin as possible. As the ceria-based electrolyte, CGO ($Ce_{0.9}Gd_{0.1}O_2$) and SDC ($Sm_{0.2}Ce_{0.8}O_2$) are widely used. However, due to a property of the ceria-based electrolyte, it is difficult to form the ceria-based electrolyte to be dense and thin on a porous fuel electrode.

In a general method of fabricating the fuel electrode and the electrolyte, the fuel electrode is formed into a pellet, and the electrolyte is formed by a coating or dipping process, thereby fabricating the fuel electrode and the electrolyte. However, since the porous fuel electrode and the ceria-based electrolyte respectively have a different shrinkage, it is difficult to form the thin and dense electrolyte.

In other fabrication method, the fuel electrode and the electrolyte are formed in a sheet shape by a tape casing process and then stacked, thereby fabricating the SOFC. In the case, although it is possible to form the dense electrolyte, there are also some problems that an amount of powder wasted during the fabricating process is very large and a fabricating time is also too long.

Therefore, the present invention provides a new fabrication method of the SOFC having advantages of the pellet process and the tape casting process.

DISCLOSURE OF THE INVENTION

It is an object of the present invention to provide a fabrication method of a SOFC, in which porosity of a fuel electrode can be adjusted, electrolyte is formed to dense and the SOFC can be mass-produced by a simple process which can minimize the wasted material, and the SOFC (structure of the fuel electrode and the electrolyte) fabricated by the method.

To achieve the object, there is provided a fabrication method of a fuel electrode and electrolyte of a solid oxide fuel cell (SOFC) in which a sheet cell including a fuel electrode sheet and an electrolyte sheet is positioned at an upper side of a surface of a fuel electrode pellet, comprising steps of (a) molding and heat-treating powder, in which a fuel electrode material is mixed with a pore forming agent, so as to prepare a fuel electrode pellet; (b) stacking the fuel electrode sheet containing the fuel electrode material and the electrolyte sheet containing an electrolyte material so as to prepare the sheet cell; and (c) coating an adhesive slurry containing the fuel electrode material on the sheet cell or the pellet and adhering the fuel electrode sheet of the sheet cell and the pellet and then heat-treating it.

Preferably, the heat treatment in the step (a) is firstly performed at a temperature of 600 to 900° C. and then secondly performed at a temperature of 1300 to 1600° C., and a heating rate for the heat treatment at the temperature of 600 to 900° C. is 50 to 80° C. per hour.

Preferably, the heat treatment in the step (c) is performed at a temperature of 1300 to 1600° C., and a refractory or heat resistant alloy is positioned at the upper side of the sheet cell and pellet adhered to each other and then the heat treatment is performed, in order to apply a pressure during the heat treatment in the step (c).

Preferably, the fuel electrode material in the steps (a), (b) and (c) is NiO, Ce-based oxide or a mixture of the NiO and Ce-based oxide, and the electrolyte material in the step (b) is the Ce-based oxide, and the Ce-based oxide is $Ce_{0.9}Gd_{0.1}O_2$, $Sm_{0.2}Ce_{0.8}O_2$, or a mixture thereof, and the mixture of the NiO and Ce-based oxide has 0.6 to 0.9 parts by weight of Ce-based oxide with respect to 1 part by weight of NiO, and the NiO has a specific surface area of 3 to 7 $m^2/g$, and the Ce-based oxide has a specific surface area of 30 to 40 $m^2/g$.

Preferably, the pore forming agent in the step (a) comprises carbon, and the pore forming agent is 0.05 to 0.10 parts by weight with respect to 1 part by weight of the fuel electrode material.

Preferably, the adhesive slurry containing the fuel electrode material in the step (c) comprises 0.01 to 0.05 parts by weight of the dispersing agent, 0.8 to 0.12 parts by weight of the plasticizer, 0.02 to 0.06 parts by weight of the binder and 1 to 2.2 parts by weight of the solvent with respect to 1 part by weight of the fuel electrode material.

According to the fabrication method of the solid oxide fuel cell (SOFC) of the present invention, it is possible to obtain the SOFC having a high quality and a high mass-productivity.

BEST MODE FOR CARRYING OUT THE INVENTION

Practical and presently preferred embodiments of the present invention are illustrative with reference to the accompanied drawings.

According to the present invention, a fabrication method of a fuel electrode and electrolyte of a solid oxide fuel cell (SOFC) in which a sheet cell including a fuel electrode sheet and an electrolyte sheet is positioned at an upper side of a surface of a fuel electrode pellet includes steps of (a) molding and heat-treating powder, in which a fuel electrode material is mixed with a pore forming agent, so as to prepare a fuel electrode pellet; (b) stacking the fuel electrode sheet containing the fuel electrode material and the electrolyte sheet containing an electrolyte material so as to prepare the sheet cell; and (c) coating an adhesive slurry containing the fuel electrode material on the sheet cell or the pellet and adhering the fuel electrode sheet of the sheet cell and the pellet and then heat-treating it.

That is, in the fabrication method of the fuel electrode and electrolyte of the SOFC, the powder containing the fuel electrode material and the pore forming agent is molded to form the fuel electrode into a pellet shape, and the fuel electrode sheet and the electrolyte sheet are adhered by using a fuel electrode slurry containing the fuel electrode material and an electrolytic slurry containing the electrolyte material so as to form the sheet cell, and then the pellet and the sheet cell are adhered and heat-treated.

Figure 1:
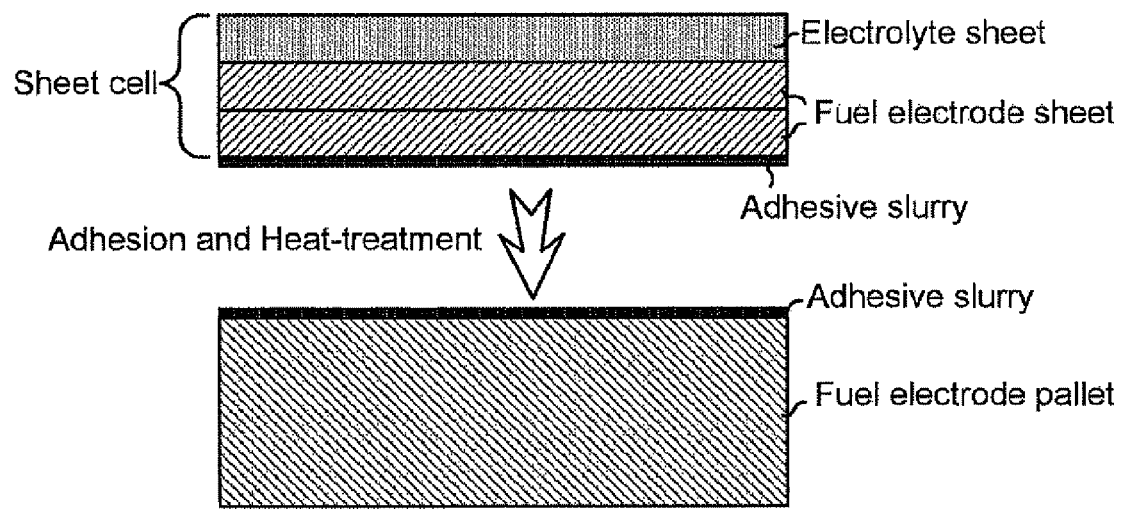
FIG. 1 is a schematic diagram showing a fuel electrode and electrolyte formed by a fabrication method according to the present invention.
Figure 2:
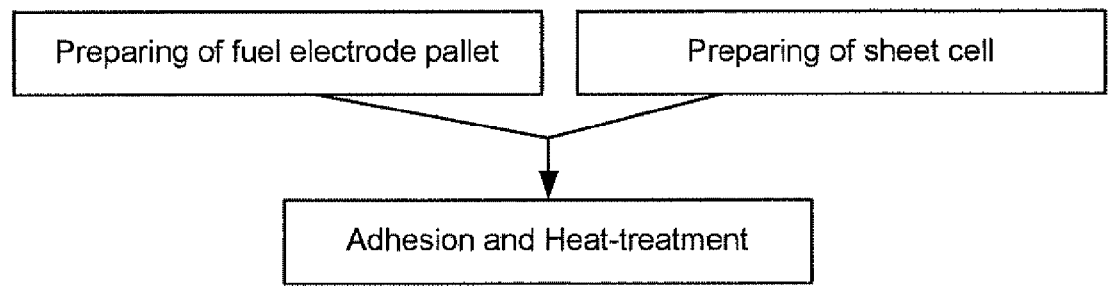
FIG. 2 is schematic diagram showing the fabrication method according to the present invention.

According to the present invention, as shown in FIGS. 1 and 2, the fuel electrode is formed into the pellet shape, and the electrolyte layer is formed into the sheet cell structure in which the fuel electrode sheet and the electrolyte sheet are stacked, and then the pellet and the sheet cell are adhered and heat-treated.

Since the fuel electrode is formed in the pellet shape, a density and size of pores formed in the fuel electrode can be facilely adjusted by controlling a pressure for forming the fuel electrode into the pellet shape, or controlling an amount or a particle size of pore forming agent, and also the fuel electrode can be mass-produced by an easy and simple process. In addition, according to the present invention, since the electrolyte is formed into a sheet cell that a fuel electrode sheet and an electrolyte sheet are stacked, it is possible to obtain the dense electrolyte. Also the fuel electrode pellet and the fuel electrode sheet of the sheet cell are adhered to each other and then treated by heat so as to fabricate the fuel electrode and the electrolyte, thereby having excellent adhesion due to the heat treatment, minimizing the wasted materials and mass-producing the fuel electrode and the electrolyte by the simple process.

The fuel electrode material in the steps (a), (b) and (c) is NiO, Ce-based oxide or a mixture of the NiO and Ce-based oxide, and the electrolyte material in the step (b) is the Ce-based oxide. The Ce-based oxide is $Ce_{0.9}Gd_{0.1}O_2$, $Sm_{0.2}Ce_{0.8}O_2$ or a mixture thereof. It is preferable that the mixture of the NiO and Ce-based oxide has 0.6 to 0.9 parts by weight of Ce-based oxide with respect to 1 part by weight of NiO, the NiO has a specific surface area of 3 to 7 $m^2/g$ and the Ce-based oxide has a specific surface area of 30 to 40 $m^2/g$.

In order to realize the present invention, heat-treatment conditions for heat-treating the pellet and adhering the sheet cell and the pellet are very important. This is caused by that a physical property (porosity) of the pellet and an adhesive force between the sheet cell and the pellet are determined by the heat-treatment conditions.

When the fuel electrode is formed into the pellet shape by using a mold in the step (a), it is preferable that the pressure for forming the pellet is 40 to 100 $kgf/cm^2$ and the heat treatment in the step (a) is firstly performed at a temperature of 600 to 900° C. and then secondly performed at a temperature of 1300 to 1600° C. The first heat treatment at the temperature of 600 to 900° C. is to remove the pore forming agent, moistures and organic materials contained in the fuel electrode pellet. If the temperature is too low, the removing of the pore forming agent, moistures and organic materials is not achieved clearly, and if the temperature is too high, excessive gas is generated and thus undesired cracks or pores may be formed at the pellet and also the pellet may be damaged by thermal stress. Moreover, it is preferable that a heating rate for the heat treatment at the temperature of 600 to 900° C. is 50 to 80° C. per hour. If the heating rate is too fast over the 80° C. per hour, the undesired cracks or pores may be formed at the pellet and also the pellet may be damaged by thermal stress. And if the heating rate is too slow below the 50° C. per hour, an effect of preventing damage of the pellet is deteriorated and also it takes long time for performing the heat treatment.

The second heat treatment at the temperature of 1300 to 1600° C. for sintering the pellet may be performed continuously or discontinuously after the first heat treatment at the temperature of 600 to 900° C. If the second heat treatment for sintering the pellet is lower than the temperature range, due to the poor densification the physical property of pellet is deteriorated. If the second heat treatment is higher than the temperature range, the densification and coarsening are proceeded too excessively and thus it is impossible to control the predetermined porosity.

Preferably, a heat treatment in the step (c) for adhering the sheet cell and the pellet is performed at a temperature of 1400 to 1600° C. In this temperature range, the fuel electrode sheet of the sheet cell and pellet have a strong interface therebetween, and the densification in the electrolyte sheet of the sheet cell is optimized, and it is prevented that the pores of the pellet are deteriorated.

In order to apply a pressure during the heat treatment in the step (c), a refractory or heat resistant alloy is positioned at the upper side of the sheet cell and pellet adhered to each other and then the heat treatment is performed. This process is a method of applying the pressure by using gravity to increase strength of the interface between the sheet cell and the pellet and each sheet interface of the sheet cell, thereby obtaining an excellent adhesion, however, the method of applying the pressure is not limited to this process. Alternatively, there may be provided other pressing methods using an internal gas pressure or a pressing apparatus mountable in a heat-treatment furnace, instead of stacking the refractory or the heat resistant alloy.

When performing the heat treatment in the step (a) and (c), the temperature for the heat treatment has a greater influence on the sintering and adhering than any other condition. Preferably, the heat treatment time is optimized so as to obtain the predetermined porosity and densification and also to sufficiently remove the organic materials, moistures and/or pore forming agents in the each heat-treatment step according to the size of pellet, the number of stacked sheets of the sheet cell, the size of sheet cell, the organic materials generating gas and the amount of pore forming agent. More preferably, the heat treatment in the step (a) is performed for 30 minutes~3 hours at the temperature of 600 to 900° C. and then performed again for 2~6 hours at the temperature of 1300 to 1600° C., and the heat treatment in the step (c) is performed for 30 minutes~2 hours at the temperature of 1400 to 1600° C.

According to the fabrication method of sheet cell in the step (b), the sheet cell may be fabricated by using a conventional method in which the fuel electrode and electrolyte formed into a sheet prepared by a tape casting process is stacked in layers to fabricate the SOFC (US Patent Publication No. 2006-0093887; US Patent Publication No. 2007-0015045; K. Y. Yoon et al. "Polarization measurements on single-step co-fired solid oxide fuel cells", Journal of Powder Sources, 2007, in press; T. Misono et al. "Ni-SDC cermet anode fabricated from NiO.SDC composite powder for intermediate temperature SOFC", Journal of Powder Sources, 157, 2006, 754-757, Journal of the European Ceramic Society, 2007, 27, page 673-678 "Tape casting of new electrolyte and anode materials for SOFCs operated at intermediate temperature").

However, the fuel electrode sheet is prepared by using the slurry of the same material as the fuel electrode material for forming the fuel electrode pellet of the present invention using the tape casting process, and the electrolyte is prepared by using the slurry of the electrolyte material of the present invention ($Ce_{0.9}Gd_{0.1}O_2$, $Sm_{0.2}Ce_{0.8}O_2$ or a mixture thereof). The slurries have a proper viscosity and dispersibility by mixing the fuel electrode material or electrolyte material with dispersing agent, plasticizer, binder or solvent, or a mixture thereof. A single electrolyte sheet and one or more fuel electrode sheets are stacked each other and then calcined at a temperature of 400 to 900° C. and sintered at a temperature of 1200 to 1500° C., thereby fabricating the sheet cell in the form of a stacked shape.

The plasticizer used in the slurry preparation functions to weaken a directly pulling force between high molecules, which maintains strength of a high molecular material, so that the slurry has flexibility. The binder is absorbed into a ceramic particle surface so as to maintain a binding force between particles, delay a sedimentation rate of particles and also increase a viscosity and moving speed of liquid phase.

The dispersing agent functions to promote a dispersing process so that various particles are uniformly distributed within the slurry. PVPD (Polyvinylpyrrolidone), LPI or a mixture thereof may be used as the dispersing agent, and PEG (Polyethylene glycol), Benzyl-butyl phthalate or a mixture thereof may be used as the plasticizer, and Butvar B-98, PVB (Polyvinylbutyral) or a mixture thereof may be used as the binder, and Xylene, 1-Butanol or a mixture thereof may be used as the solvent.

Before adhering and heat-treating the sheet cell prepared in the step (b) and the pellet prepared in the step (a), the adhesive slurry is coated on the fuel electrode sheet surface of the sheet cell and one surface of the pellet, and the sheet cell and pellet are stacked and then heat-treated. At this time, since the sheet cell and pellet are partially sintered by the heat treatment, the interface between the sheet cell and the pellet has a desired strength and also has a driving force for a new sintering process. Therefore, it is important to control the viscosity of the adhesive slurry so as to improve application of the slurry. It is preferable that the adhesive slurry is prepared by using less amount of binder but more amount of solvent. Preferably, the adhesive slurry includes 0.01 to 0.05 parts by weight of the dispersing agent, 0.8 to 0.12 parts by weight of the plasticizer, 0.02 to 0.06 parts by weight of the binder and 1 to 2.2 parts by weight of the solvent with respect to 1 part by weight of the fuel electrode material.

In the fabrication method of the present invention as described above, there is provided a fabrication method of only the fuel electrode and the electrolyte. However, an air electrode (cathode) may be also formed by a general method of forming the air electrode, such as the tape casting or depositing process, at the upper side of the electrolyte. Further, since the core idea of the present invention relates the fabrication method of the fuel electrode and the electrolyte, the SOFC including the fuel electrode and electrolyte fabricated by the above method will be included in a right of the present invention and thus may be readily utilized as a basis for modifying or designing other embodiments for carrying out the same purposes of the present invention.

FIRST EMBODIMENT

Figure 3:
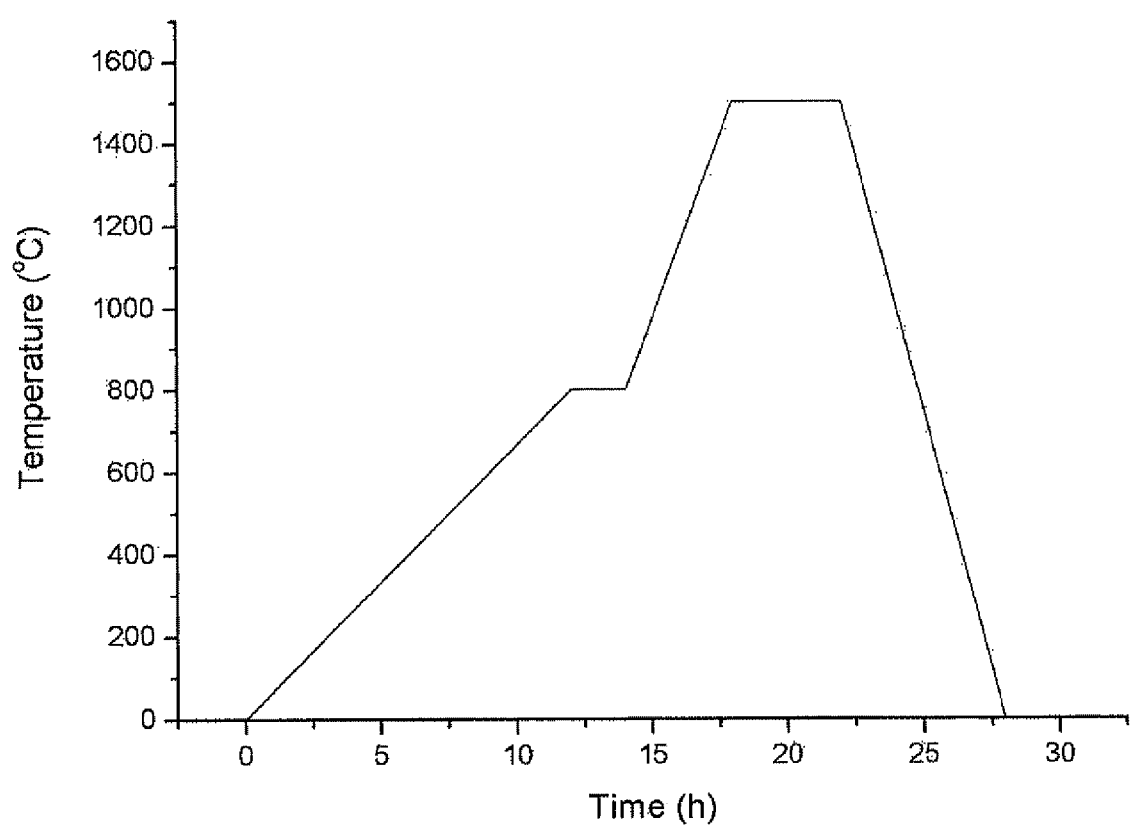
FIG. 3 is a graph showing a temperature profile in heat-treating a fuel electrode pellet according to the present invention.
Figure 4:
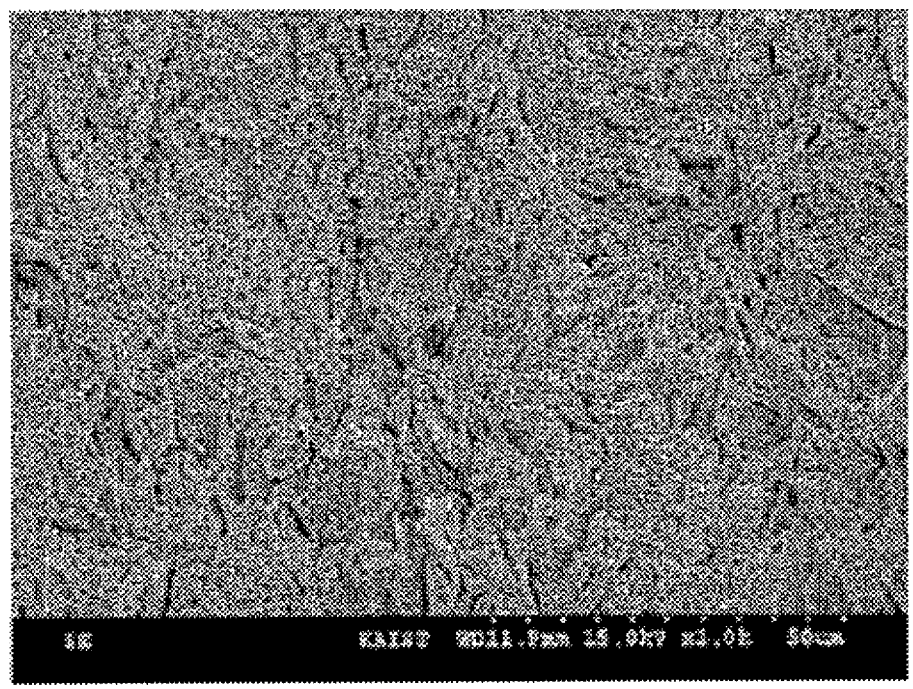
FIG. 4 is a photo taken by SEM (Scanning Electron Microscope) showing a cross section of the fuel electrode pellet according to the present invention.

Preparing of Fuel Electrode Pellet 60 g of NiO (Sumitomo metal mining Co., LTD, NiO FP 60690) and 40 g of $Ce_{0.9}Gd_{0.1}O_2$ (Rhodia Ankasei Co., LTD, UH-061215) as a fuel electrode material and 5 g of graphite type carbon (Hyundai coma ind. Co., LTD, CS12) as a pore forming agent are mixed with 150 ml of acetone, and then ball-milled for 24 hours using zirconia balls. After the ball-milling process, the acetone is evaporated and only powder is remained. The powder is sifted by using a shifter of 30 μm. In order to form the powder into a pellet shape, the powder is filled into a mold and then a pressure of 60 kgf/cm² is applied. The pellet is put on a high pure alumina plate, inserted into a heat treatment furnace and heat-treated according to the temperature profile of FIG. 3, thereby preparing the fuel electrode pellet. FIG. 4 is a photo taken by SEM (Scanning Electron Microscope) showing a cross section of the fuel electrode pellet according to the present invention. As shown in FIG. 4, pores having a constant size are uniformly distributed in the pellet.

Preparing of Sheet Cell 50 g of $Ce_{0.9}Gd_{0.1}O_2$ (Rhodia Ankasei Co., LTD, UH-061215) is mixed with 1 g of PVPD (SIGMA, PVP10), 5 g of PEG (SIGMA, P3265), 9 g of Butvar B-98 (SIGMA, B0154) and 55 g of solvent containing 78 wt % of xylene (SAMCHUN CHEMICALS, 120806) and 22 wt % of 1-butanol (SAMCHUN CHEMICALS, 081106), and then ball-milled for 78 hours using zirconia balls so as to preparing electrolyte slurry. The prepared electrolyte slurry is filled into a film for forming a sheet, and an electrolyte sheet is prepared by using a screen of 5 Mil (0.127 mm) and then dried for 3 hours at a room temperature.

60 g of NiO (Sumitomo metal mining Co., LTD, NiO FP 60690) and 40 g of $Ce_{0.9}Gd_{0.1}O_2$ (Rhodia Ankasei Co., LTD, UH-061215) are mixed with 2 g of PVPD (SIGMA, PVP10), 10 g of PEG (SIGMA, P3265), 18 g of Butvar B-98 (SIGMA, B0154) and 110 g of solvent containing 78 wt % of xylene (SAMCHUN CHEMICALS, 120806) and 22 wt % of 1-butanol SAMCHUN CHEMICALS, 081106), and then ball-milled for 78 hours using zirconia balls so as to preparing fuel electrode slurry.

The prepared fuel electrode slurry is tape-casted in a thickness of 150 μm on the dried electrolyte sheet.

The prepared fuel electrode slurry is filled into the film for forming a sheet, and a fuel electrode sheet having a thickness of about 100 μm is prepared by using the screen of 5 Mil (0.127 mm) and then dried for 3 hours at a room temperature.

Figure 5:
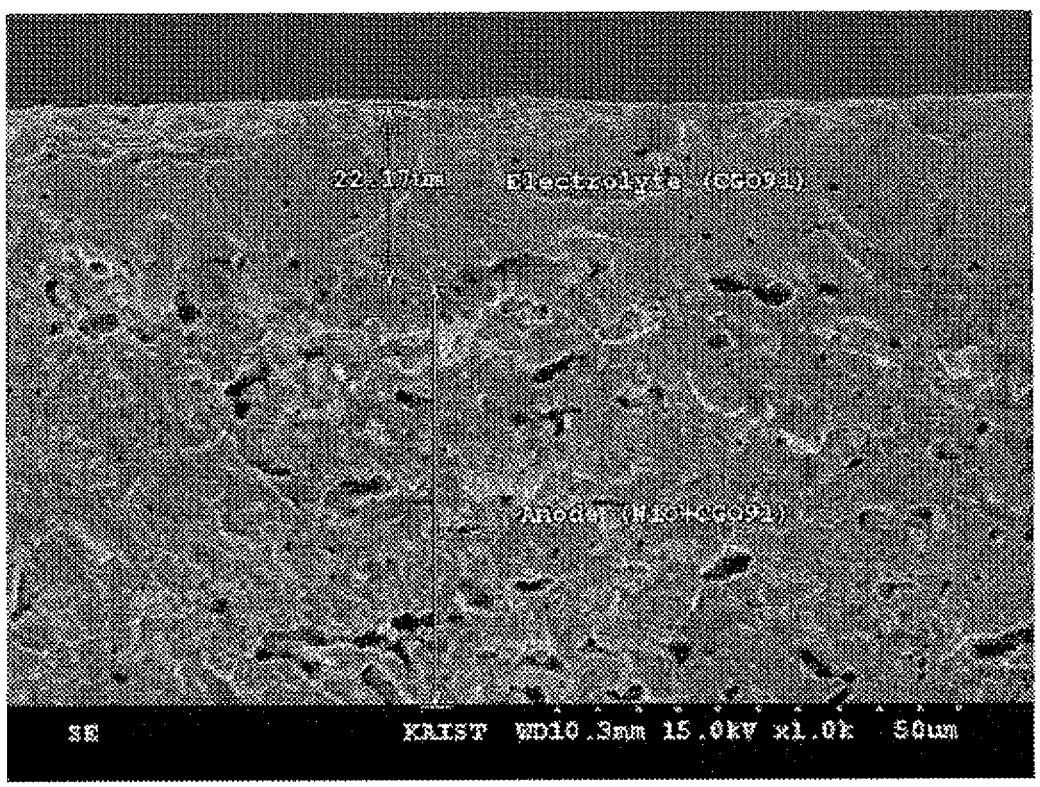
FIG. 5 is a photo taken by SEM showing a cross section of a sheet cell according to the present invention.
Figure 6:
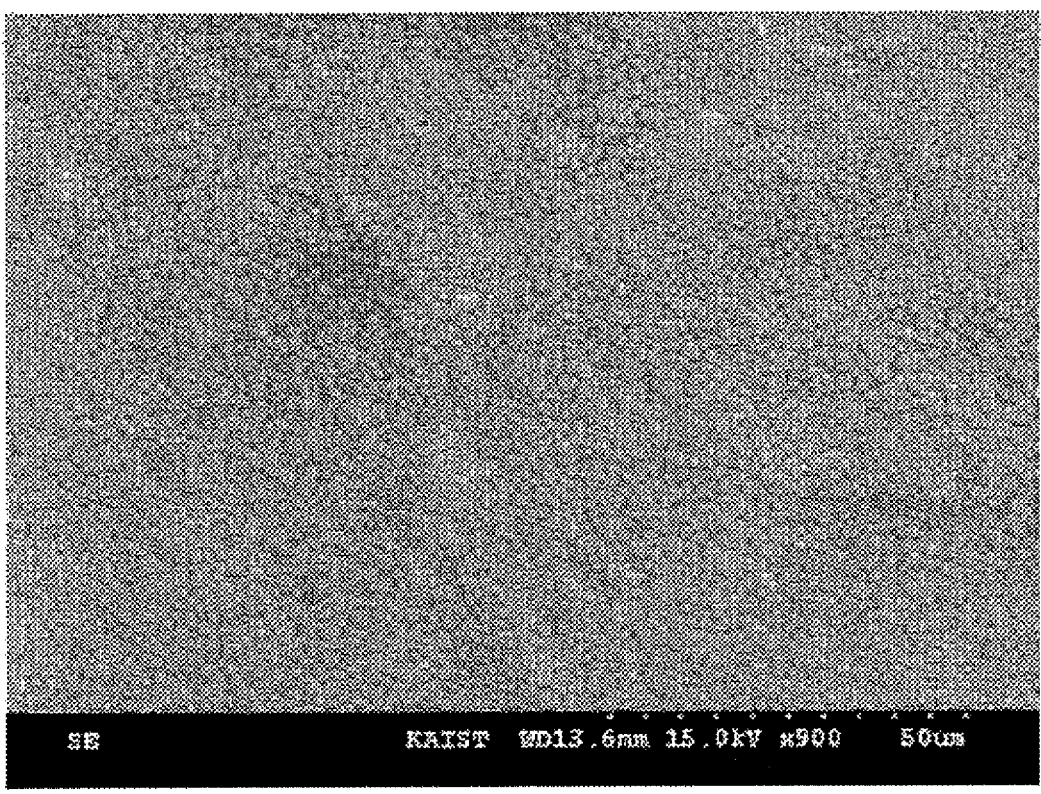
FIG. 6 is a photo taken by SEM showing a surface of an electrolyte sheet of the sheet cell according to the present invention.

Three fuel electrode sheets are prepared by the same method, and the three fuel electrode sheets and electrolyte sheet are cut to a size of 4 cm×4 cm. The cut three fuel electrode sheets and electrolyte sheet are stacked so that the fuel electrode materials tape-cated thereon are contacted with each other, and calcined at a temperature of 400° C. and then heat-treated for 4 hours at a temperature of 1000° C., thereby fabricating a sheet cell. FIG. 5 is a photo taken by SEM showing a cross section of the sheet cell according to the present invention, and FIG. 6 is a photo taken by SEM showing a surface of the electrolyte sheet of the sheet cell according to the present invention. As shown in FIGS. 5 and 6, the pores are hardly formed in the electrolyte sheet due to the densification of the electrolyte sheet.

Adhering Between Pellet and Sheet Cell 6 g of NiO (Sumitomo metal mining Co., LTD, NiO FP 60690) and 4 g of $Ce_{0.9}Gd_{0.1}O_2$ (Rhodia Ankasei Co., LTD, UH-061215) are mixed with 0.2 g of PVPD (SIGMA, PVP10) as dispersing agent, 1 g of PEG (SIGMA, P3265) as plasticizer, 0.5 g of Butvar B-98 (SIGMA, B0154) as binder and 11 g of solvent containing 78 wt % of xylene (SAMCHUN CHEMICALS, 120806) and 22 wt % of 1-butanol (SAMCHUN CHEMICALS, 081106), and then ball-milled for 78 hours using zirconia balls so as to preparing fuel electrode slurry.

Figure 7:
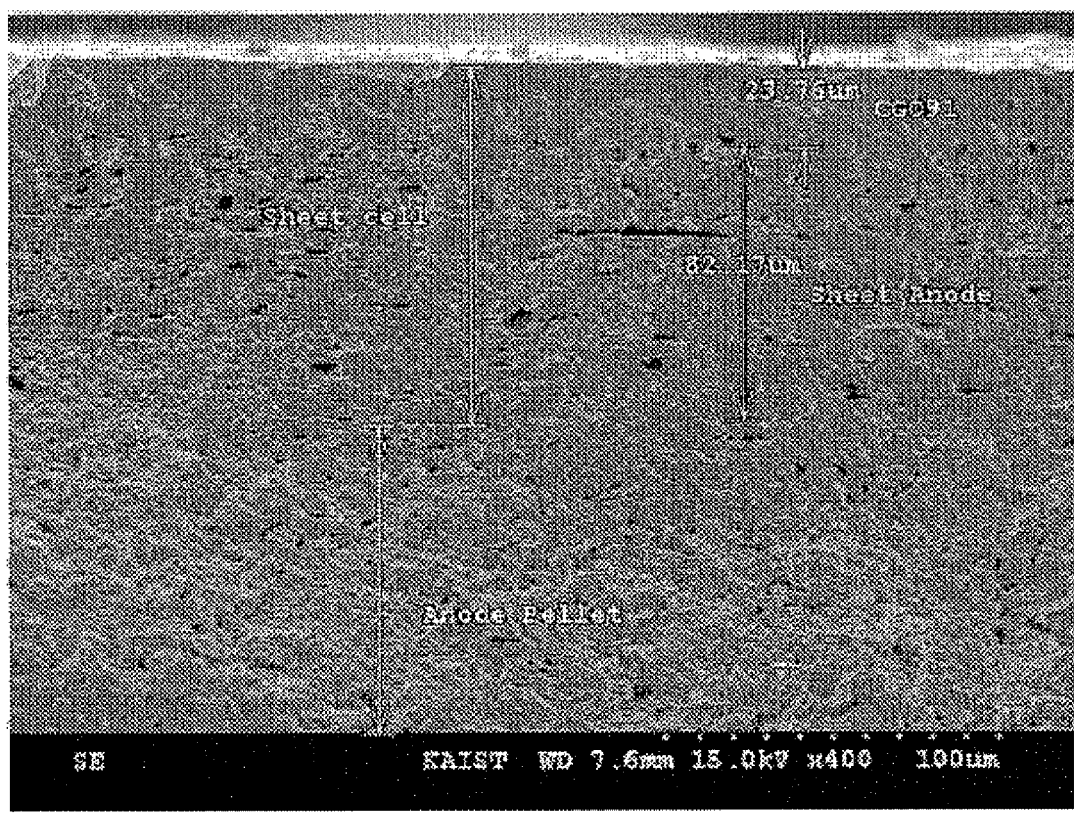
FIG. 7 is a photo taken by SEM showing a cross section of the fuel electrode and the electrolyte adhered to each other according to the present invention.

The prepared pellet and the fuel electrode sheet of the sheet cell are coated with an adhesive slurry, stacked to each other and then positioned on the alumina plate. An alumina plate (4×4×3 cm) is positioned at an upper side of the stacked pellet and sheet cell, and they are inserted into a heat treatment furnace and sintered for 1 hour at a temperature of 1500° C., thereby fabricating the fuel electrode and electrolyte of the SOFC. FIG. 7 is a photo taken by SEM showing a cross section of the pellet and the electrolyte adhered to each other according to the present invention. As shown in FIG. 7, pores or cracks are not formed in a cross section of the adhered pellet and electrolyte. Therefore, it is possible to obtain the fuel electrode having adjusted pores and the dense electrolyte.

INDUSTRIAL APPLICABILITY

According to the present invention, since the fuel electrode is formed into the pellet shape, a density and size of pores formed in the fuel electrode can be facilely adjusted by controlling a pressure for forming the fuel electrode into the pellet shape, or controlling an amount or a particle size of pore forming agent, and also the fuel electrode can be mass-produced by an easy and simple process. In addition, according to the present invention, since the electrolyte is formed into a sheet cell that a fuel electrode sheet and an electrolyte sheet are stacked, it is possible to obtain the dense electrolyte. Also the fuel electrode pellet and the fuel electrode sheet of the sheet cell are adhered to each other and then treated by heat so as to fabricate the fuel electrode and the electrolyte, thereby having excellent adhesion due to the heat treatment, minimizing the wasted materials and mass-producing the fuel electrode and the electrolyte by the simple process.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A fabrication method of a fuel electrode and electrolyte of a solid oxide fuel cell (SOFC) in which a sheet cell including a fuel electrode sheet and an electrolyte sheet is positioned at an upper side of a surface of a fuel electrode pellet, comprising steps of:
  (a) molding and heat-treating powder, in which a fuel electrode material is mixed with a pore forming agent, so as to prepare a sintered fuel electrode pellet;
  (b) stacking (i) a fuel electrode sheet fabricated by tape casting using a fuel electrode slurry containing a fuel electrode material and (ii) an electrolyte sheet fabricated by tape casting using an electrolyte slurry containing an electrolyte material, and heat-treating the stacked sheets of the fuel electrode sheet and the electrolyte sheet so as to prepare a sintered sheet cell; and
  (c) coating an adhesive slurry containing a fuel electrode material on the sintered sheet cell or the sintered pellet and adhering the fuel electrode sheet of the sintered sheet cell and the sintered pellet and then heat-treating it.

2. The fabrication method as set forth in claim 1, wherein the heat treatment in the step (a) is firstly performed at a temperature of 600 to 900° C. and then secondly performed at a temperature of 1300 to 1600° C.

3. The fabrication method as set forth in claim 2, wherein a heating rate for the heat treatment at the temperature of 600 to 900° C. is 50 to 80° C. per hour.

4. The fabrication method as set forth in claim 1, wherein the heat treatment in the step (c) is performed at a temperature of 1300 to 1600° C.

5. The fabrication method as set forth in claim 1, wherein a refractory or heat resistant alloy is positioned at the upper side of the sheet cell and pellet adhered to each other and then the heat treatment is performed, in order to apply a pressure during the heat treatment in the step (c).

6. The fabrication method as set forth in claim 2, wherein the fuel electrode material in the steps (a), (b) and (c) is NiO, Ce-based oxide or a mixture of the NiO and Ce-based oxide, and the electrolyte material in the step (b) is the Ce-based oxide.

7. The fabrication method as set forth in claim 6, wherein the Ce-based oxide is $Ce_{0.9}Gd_{0.1}O_2$, $Sm_{0.2}Ce_{0.8}O_2$ or a mixture thereof.

8. The fabrication method as set forth in claim 6, wherein the mixture of the NiO and Ce-based oxide has 0.6 to 0.9 parts by weight of Ce-based oxide with respect to 1 part by weight of NiO.

9. The fabrication method as set forth in claim 6, wherein the NiO has a specific surface area of 3 to 7 $m^2/g$.

10. The fabrication method as set forth in claim 7, wherein the Ce-based oxide has a specific surface area of 30 to 40 $m^2/g$.

11. The fabrication method as set forth in claim 1, wherein the pore forming agent in the step (a) comprises carbon.

12. The fabrication method as set forth in claim 11, wherein the pore forming agent is 0.05 to 0.10 parts by weight with respect to 1 part by weight of the fuel electrode material.

13. The fabrication method as set forth in claim 1, wherein the adhesive slurry containing the fuel electrode material in the step (c) comprises 0.01 to 0.05 parts by weight of dispersing agent, 0.8 to 0.12 parts by weight of plasticizer, 0.02 to 0.06 parts by weight of binder and 1 to 2.2 parts by weight of solvent with respect to 1 part by weight of the fuel electrode material.

14. A solid oxide fuel cell, the solid oxide fuel cell comprising the fuel electrode and the electrolyte fabricated by the method set forth in claim 1.

* * * * *